(12) United States Patent
King

(10) Patent No.: US 12,420,721 B2
(45) Date of Patent: Sep. 23, 2025

(54) ACCESSORY MOUNTING DEVICE FOR A REARVIEW MIRROR

(71) Applicant: Brian King, Indianapolis, IN (US)

(72) Inventor: Brian King, Indianapolis, IN (US)

( * ) Notice: Subject to any disclaimer, the term of this patent is extended or adjusted under 35 U.S.C. 154(b) by 109 days.

(21) Appl. No.: 18/392,082

(22) Filed: Dec. 21, 2023

(65) Prior Publication Data

US 2025/0206236 A1 Jun. 26, 2025

(51) Int. Cl.
*B60R 11/00* (2006.01)

(52) U.S. Cl.
CPC ....... *B60R 11/00* (2013.01); *B60R 2011/0033* (2013.01); *B60R 2011/0063* (2013.01); *B60R 2011/0071* (2013.01)

(58) Field of Classification Search
CPC ............ B60R 2001/1292; A45F 5/155; Y10T 24/1391; Y10T 24/3703; Y10T 24/3969; Y10T 24/3984; F16B 45/045; F16B 45/051; F16B 45/053; F16B 45/055; F16B 45/04
USPC .............. 248/205.4, 220.22, 221.11, 221.12, 248/223.51, 222.41, 309.1, 313, 312.1
See application file for complete search history.

(56) References Cited

U.S. PATENT DOCUMENTS

| | | | | |
|---|---|---|---|---|
| 3,604,069 A | * | 9/1971 | Jensen | H04M 1/15 24/600.6 |
| 7,337,503 B1 | * | 3/2008 | Ashbrook | F16G 11/101 24/136 R |
| D646,371 S | | 10/2011 | Kuo | |
| 9,920,783 B2 | | 3/2018 | Runge | |
| 10,933,721 B2 | | 3/2021 | Pirovolkos | |
| 2007/0175076 A1 | * | 8/2007 | Stanley | G09F 21/049 40/593 |
| 2010/0051664 A1 | | 3/2010 | Para | |
| 2014/0306076 A1 | | 10/2014 | Friesch | |
| 2017/0363139 A1 | | 12/2017 | Wang | |
| 2020/0124230 A1 | | 4/2020 | Hoffman | |

FOREIGN PATENT DOCUMENTS

WO WO2007022295 5/2007

* cited by examiner

*Primary Examiner* — Jack W Lavinder

(57) ABSTRACT

An accessory mounting device for hanging an accessory behind and below a rearview mirror includes a housing with a slot and an engagement member biased to move toward a peripheral edge of the slot. A button is movably mounted to the housing and fixed to the engagement member such that the button is movable to counteract the bias of the engagement member. To hang the accessory, the button is pressed and the accessory is placed through the slot and between the peripheral edge of the slot and the engagement member. Then the button is released to urge the engagement member via bias toward the peripheral edge of the slot, thereby grasping the accessory between the engagement member and the peripheral edge.

8 Claims, 10 Drawing Sheets

ACCESSORY MOUNTING DEVICE FOR A REARVIEW MIRROR

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mounting devices and more particularly pertains to a new mounting device for hanging an accessory behind and below a rearview mirror.

(2) Description of Related Art Including Information Disclosed Under 37 CFR 1.97 and 1.98

The prior art relates to mounting devices for mounting various items to a rearview mirror. However, the prior art fails to disclose such a device which comprises a housing with a slot extending into the housing and an engagement member that is biased to grasp an item between the engagement member and a peripheral edge of the slot.

BRIEF SUMMARY OF THE INVENTION

An embodiment of the disclosure meets the needs presented above by generally comprising a housing which has a front wall, a rear wall, and a perimeter wall. The perimeter wall is coupled to and extends between the front and rear walls. The housing defines an interior space therein, and the perimeter wall defines a slot extending therethrough to the interior space. An engagement member is movably mounted in the housing and is biased to move in a grasping action in which the engagement member is urged toward a peripheral edge of the slot. The engagement member and the peripheral edge of the slot are configured to cooperatively grasp an accessory therebetween when the engagement member is urged in the grasping action. A button is fixedly coupled to the engagement member and operable to move the engagement member in a release action away from the peripheral edge, thereby expanding a gap between the engagement member and the peripheral edge of the slot. The housing may be selectively mounted to a back side of a rearview mirror via a suitable connector.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
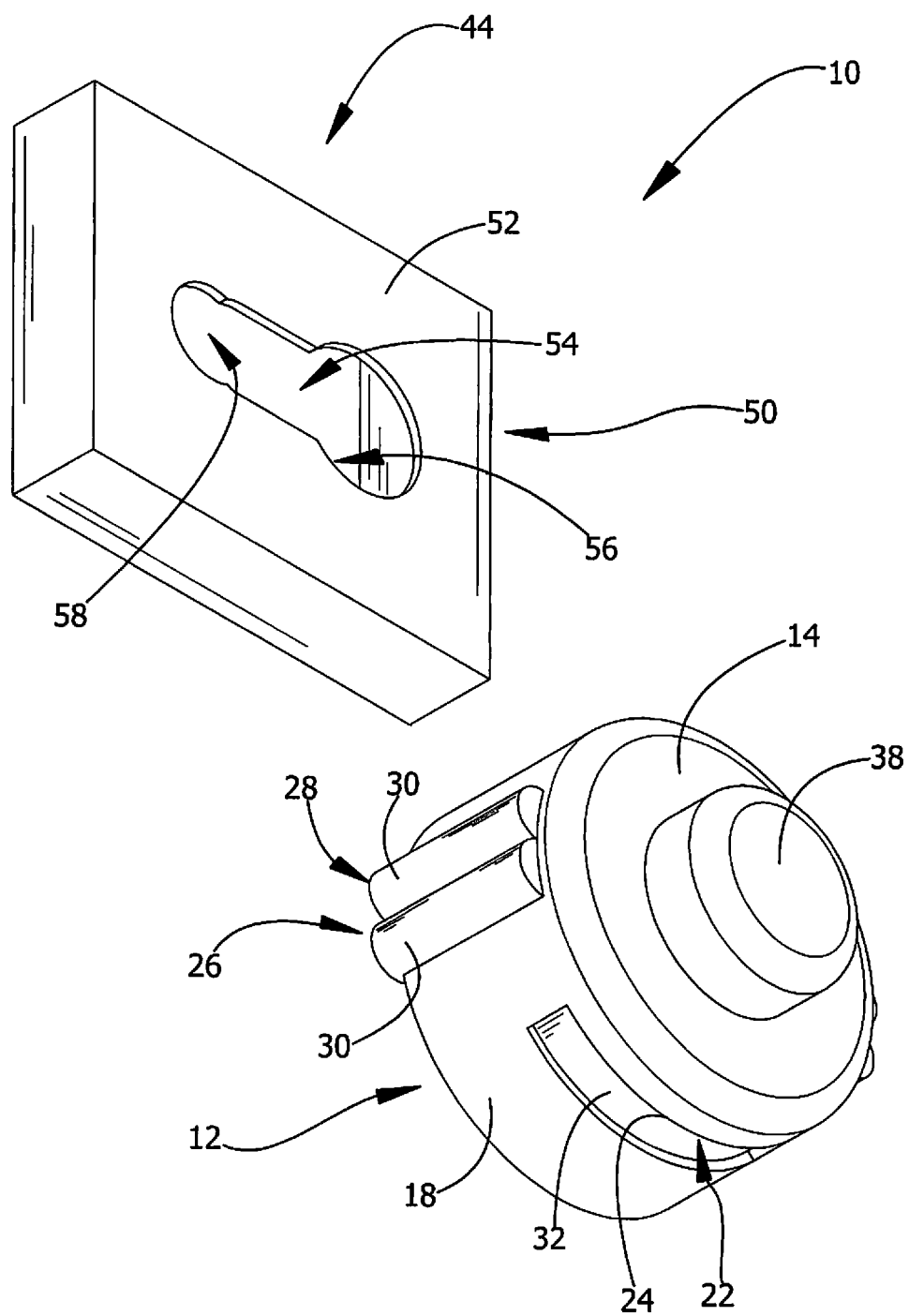
FIG. 1 is a disassembled perspective view of an accessory mounting device according to an embodiment of the disclosure.
Figure 2:
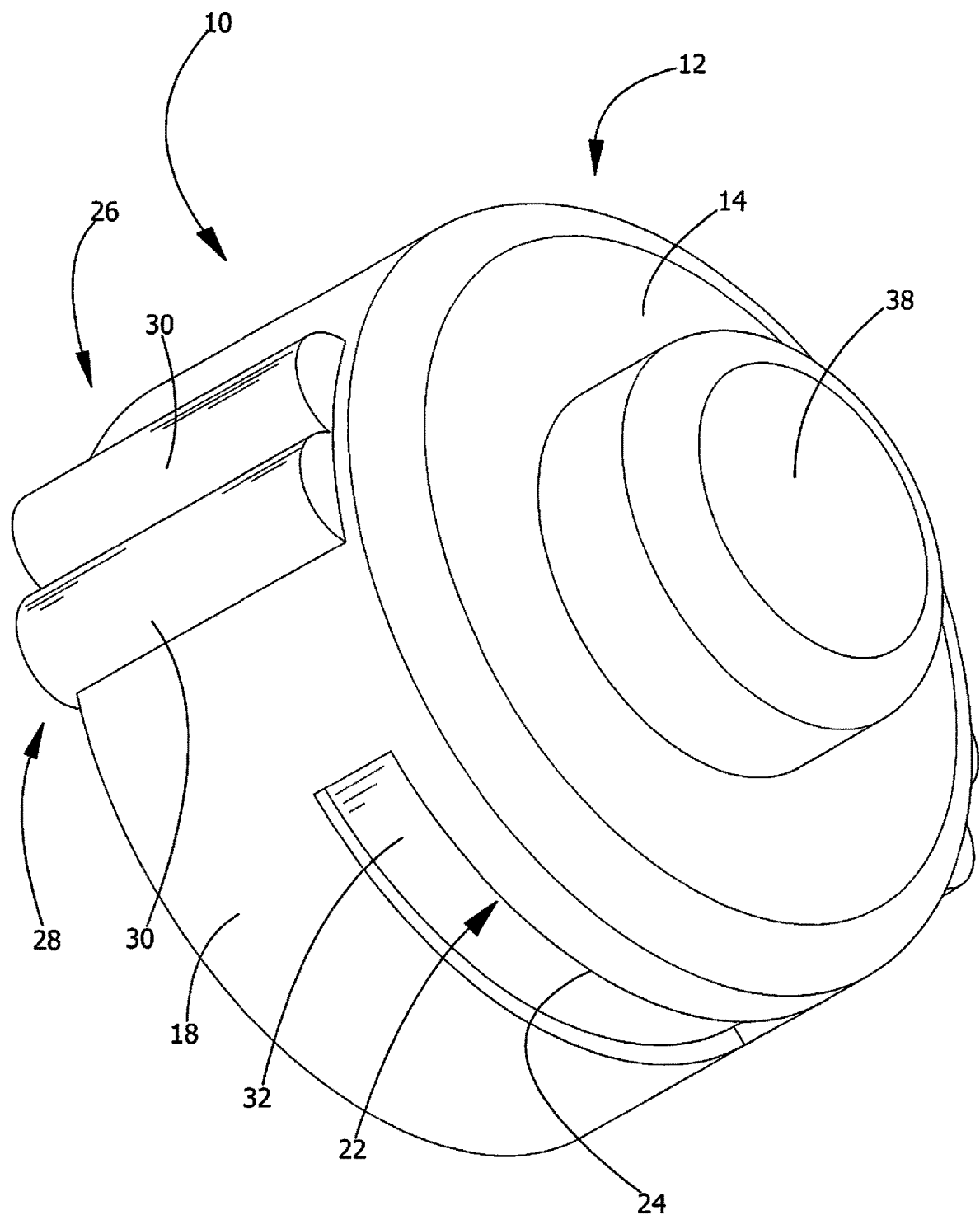
FIG. 2 is a perspective view of an embodiment of the disclosure without a second mating member of a connector.
Figure 3:
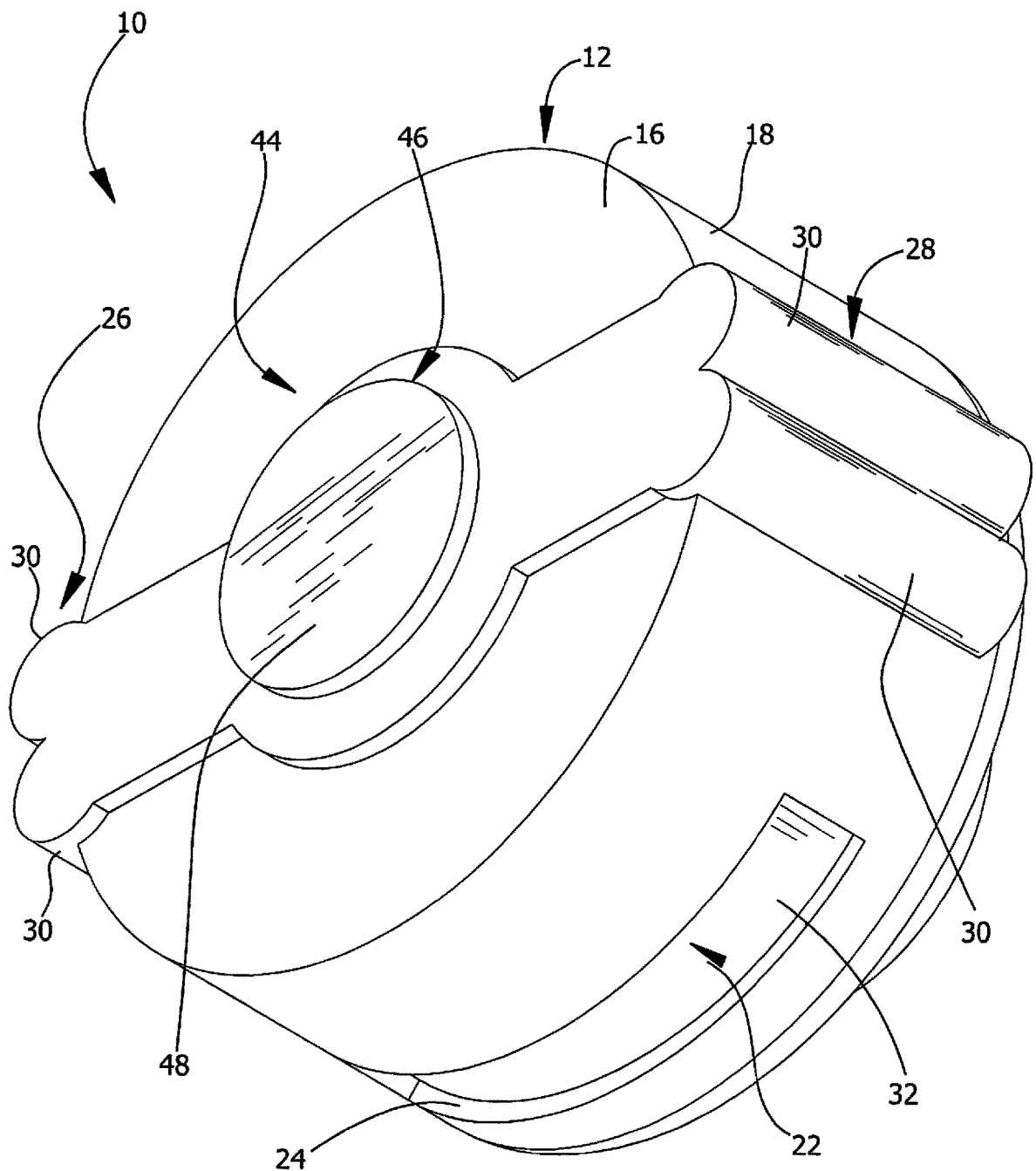
FIG. 3 is a perspective view of an embodiment of the disclosure without a second mating member of a connector.
Figure 4:
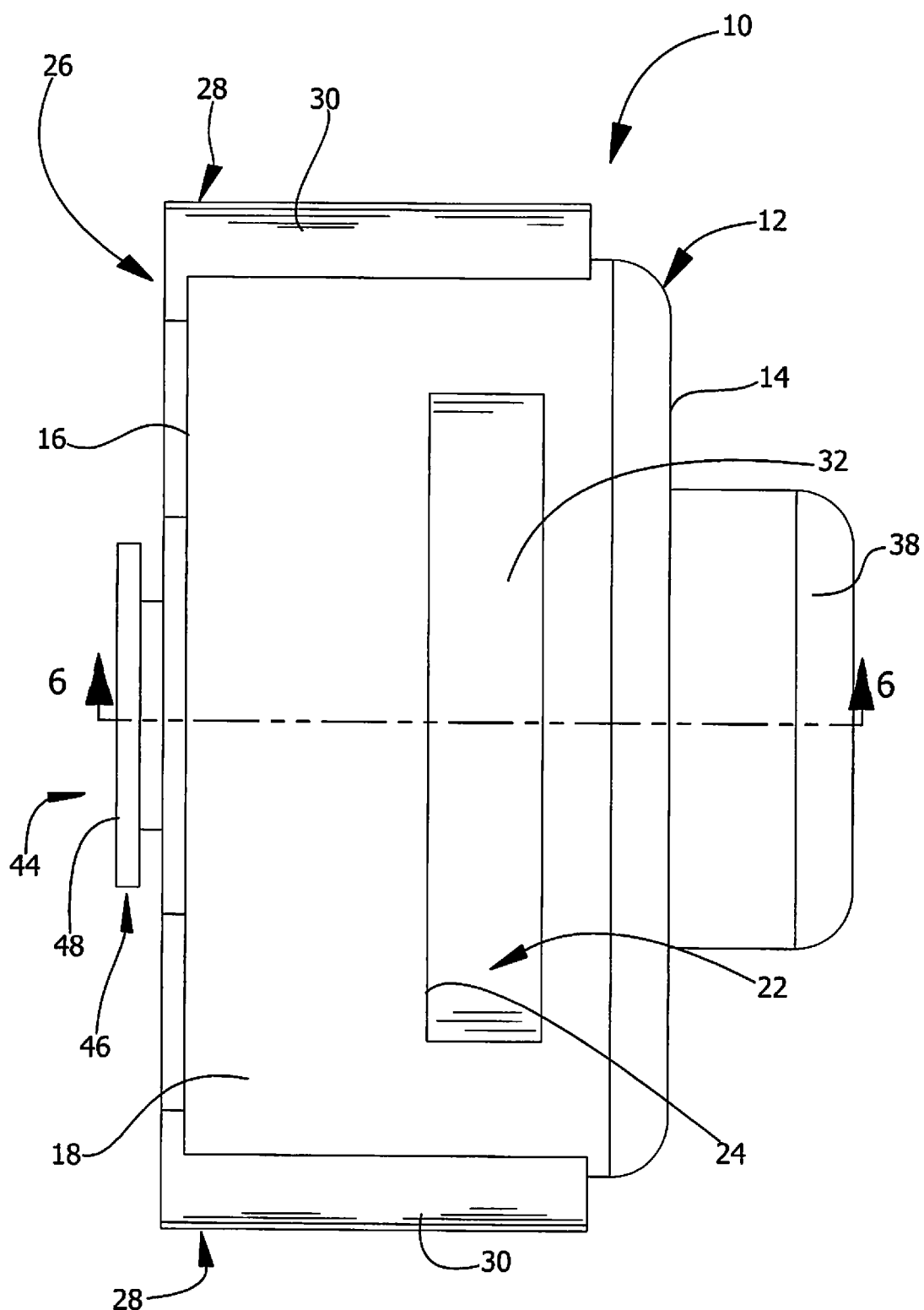
FIG. 4 is a bottom view of an embodiment of the disclosure without a second mating member of a connector.
Figure 5:
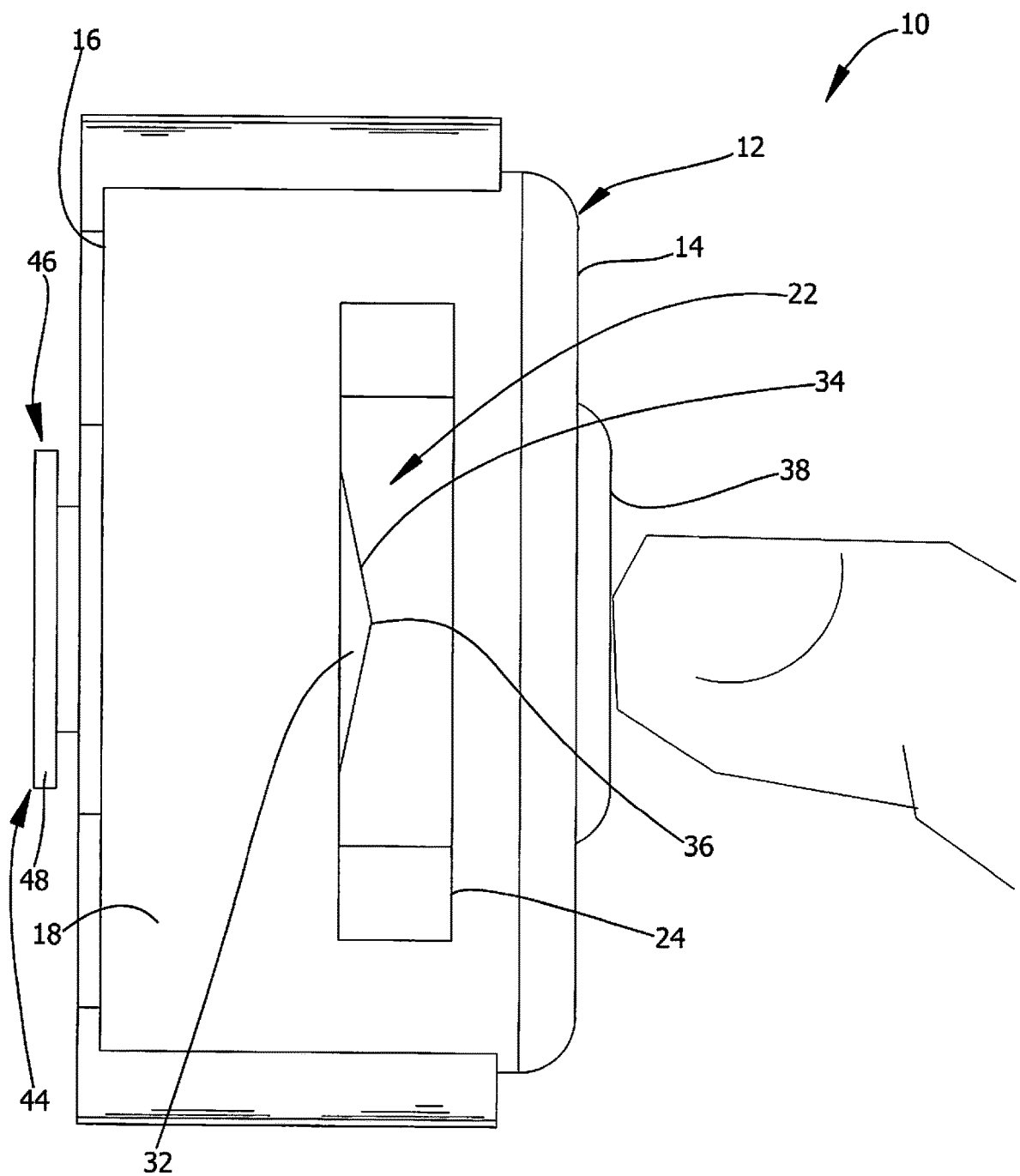
FIG. 5 is a bottom view of an embodiment of the disclosure without a second mating member of a connector. A button is being pressed to move an engagement member against bias.
Figure 6:
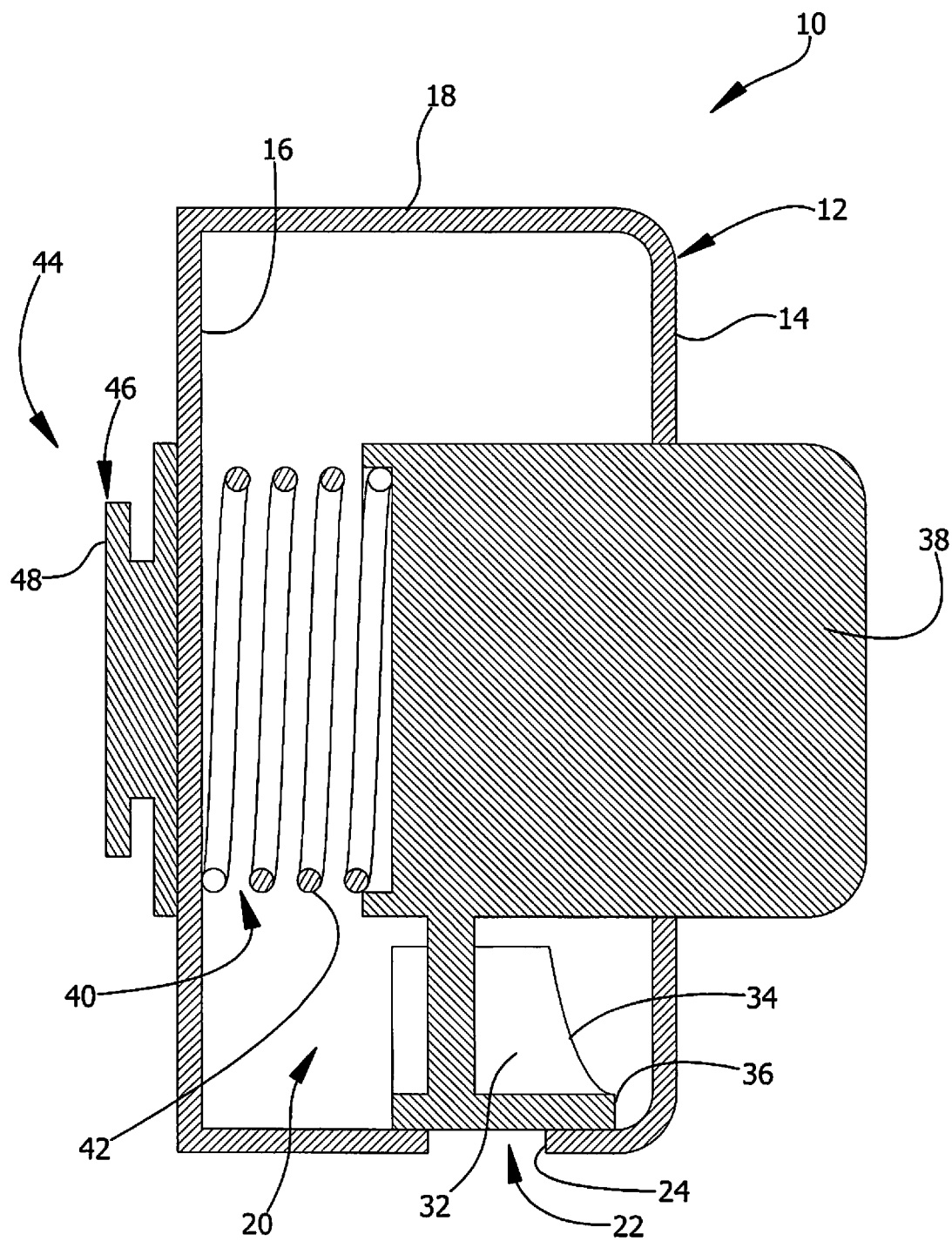
FIG. 6 is a cross-section view of an embodiment of the disclosure taken from Line 6-6 in FIG. 4.
Figure 7:
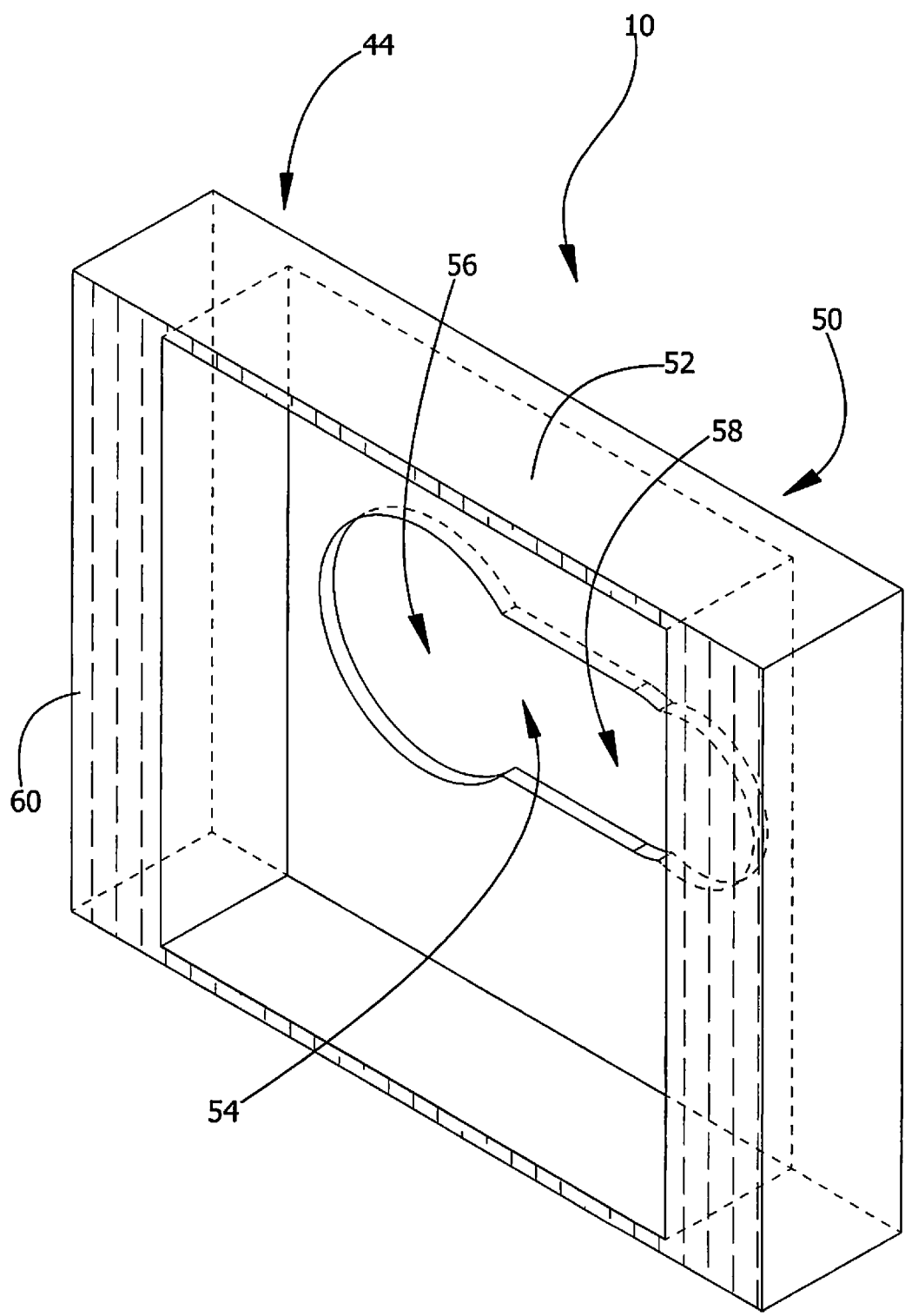
FIG. 7 is a rear view of a second mating member of a connector of an embodiment of the disclosure.
Figure 8:
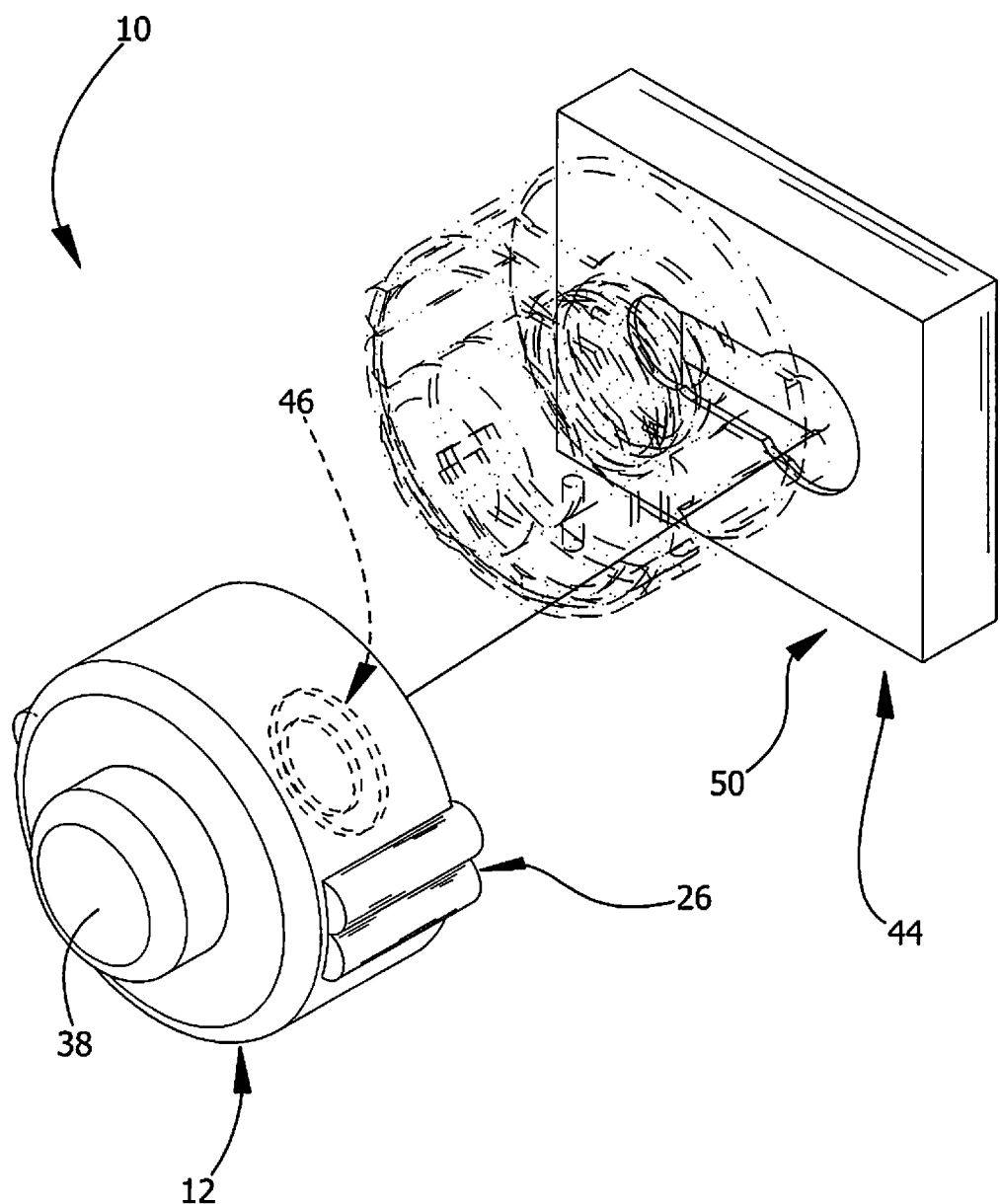
FIG. 8 is an exploded view of an embodiment of the disclosure.
Figure 9:
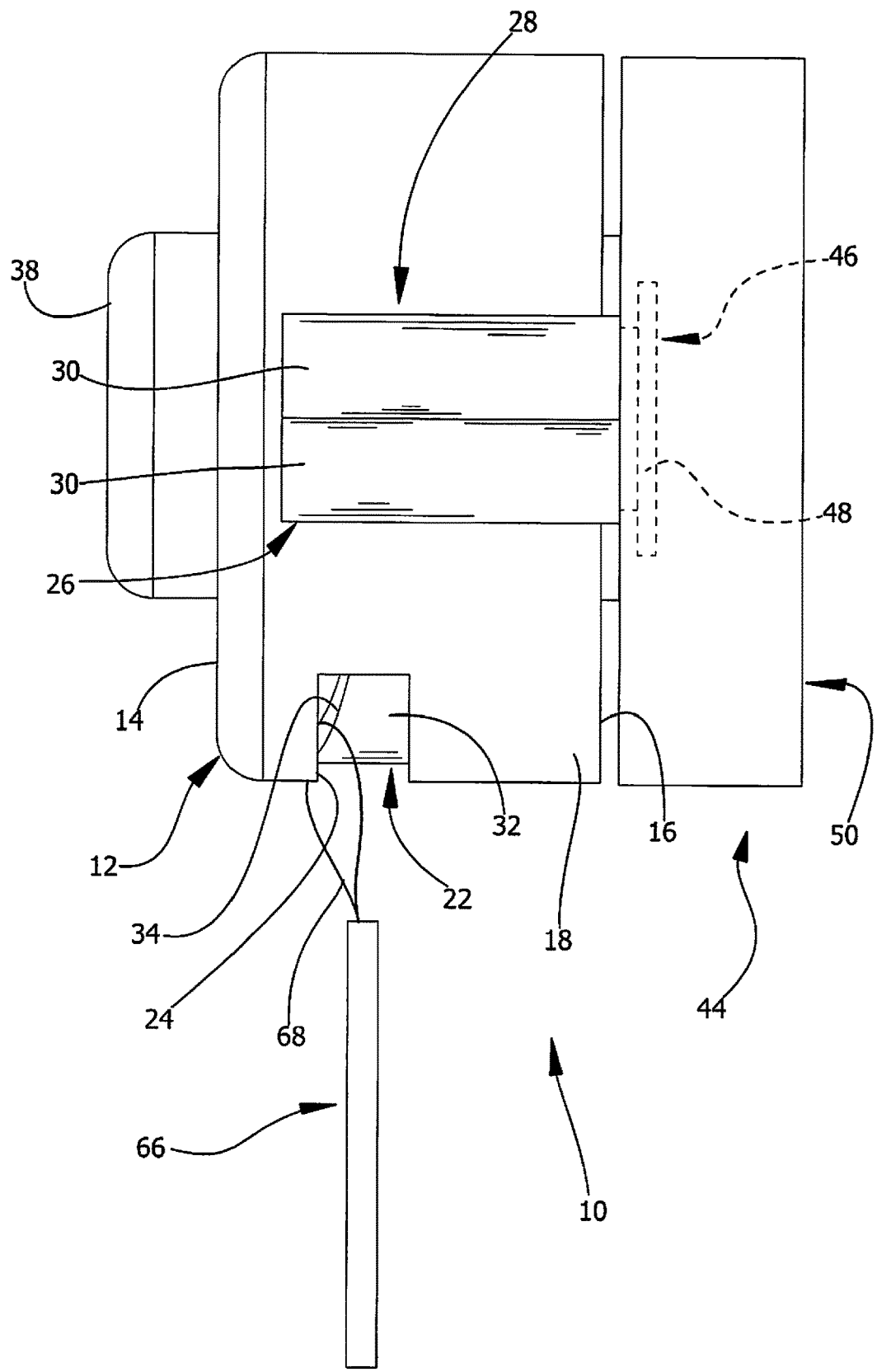
FIG. 9 is a side in-use view of an embodiment of the disclosure.
Figure 10:
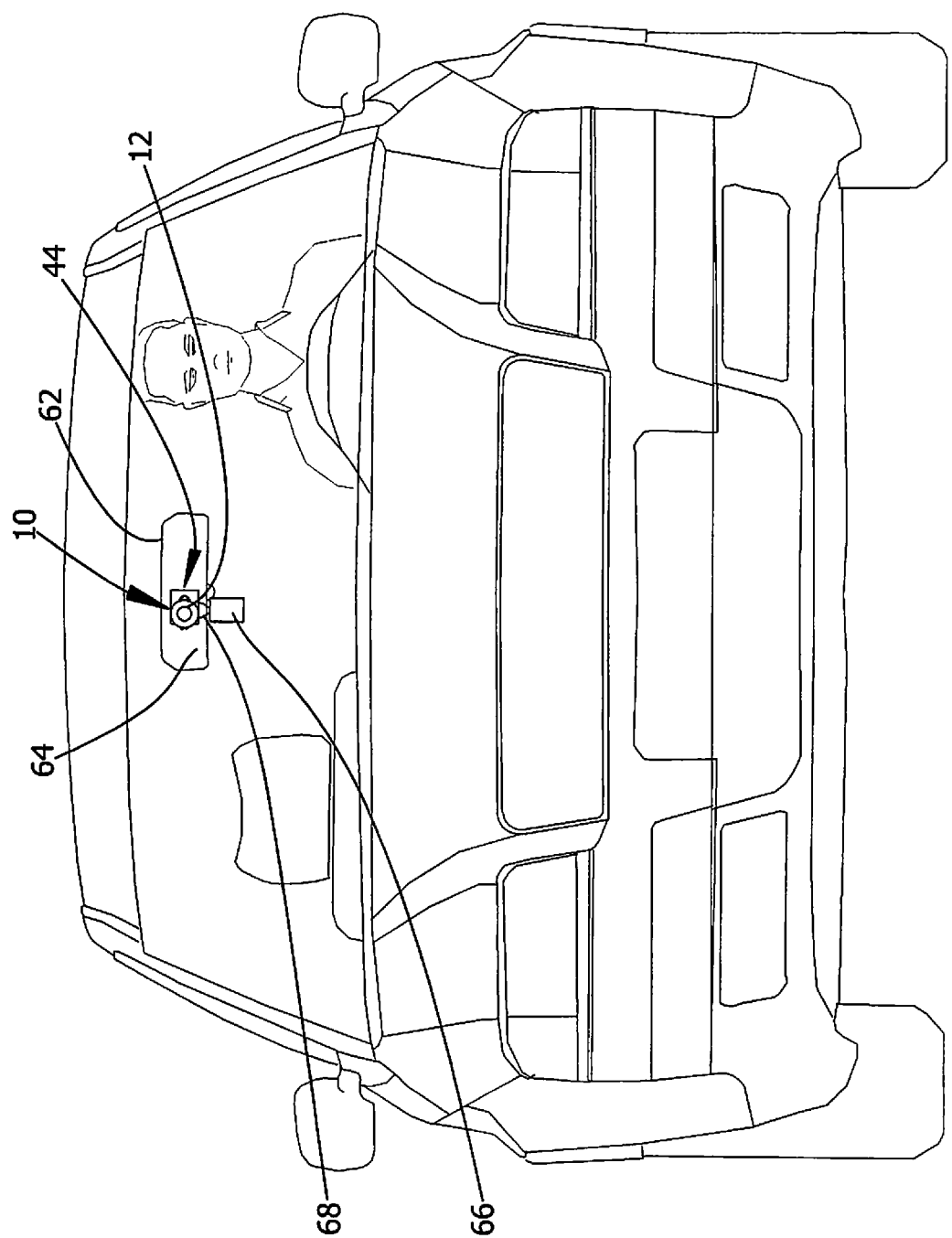
FIG. 10 is an in-use view of an embodiment of the disclosure.

With reference now to the drawings, and in particular to FIGS. 1 through 10 thereof, a new mounting device embodying the principles and concepts of an embodiment of the disclosure and generally designated by the reference numeral 10 will be described.

As best illustrated in FIGS. 1 through 10, the accessory mounting device 10 generally comprises a housing 12 which has a front wall 14, a rear wall 16, and a perimeter wall 18. The perimeter wall 18 is coupled to and extends between the front and rear walls 14, 16. The housing 12 defines an interior space 20 therein, and the perimeter wall 18 defines a slot 22 extending therethrough to the interior space 20. A grip 26 is coupled to the housing 12. The grip 26 comprises a pair of contact portions 28 positioned opposite each other across the housing 12. Each contact portion 28 comprises a pair of protrusions 30 which extend outwardly away from the housing 12.

An engagement member 32 is movably mounted in the housing 12. The engagement member 32 is biased in a grasping action in which the engagement member 32 is urged toward a peripheral edge 24 of the slot 22. The engagement member 32 and the peripheral edge 24 of the slot 22 are configured to cooperatively grasp an accessory 66 therebetween when the engagement member 32 is urged in the grasping action. The grasping action causes the engagement member 32 to move in a shearing action with the peripheral edge 24 of the slot 22 but may cause the engagement member to move in a clamping action in other embodiments. The engagement member 32 has a leading edge 34 which is configured to engage the accessory 66 during the grasping action. The leading edge 34 tapering to a pointed end 36.

A button 38 is fixedly coupled to the engagement member 32 and protrudes through the front wall 14. The button 38 is movable toward the rear wall 16 to urge the engagement member 32 in a release action away from the peripheral edge 24, thereby expanding a gap between the engagement member 32 and the peripheral edge 24 of the slot 22. A biasing member 40 is coupled to the button 38 and the housing 12. The biasing member 40 biases the engagement member 32 to move in the grasping action and comprises a compression spring 42 positioned to urge the button 38 away from the rear wall 16 of the housing 12.

A connector 44 is coupled to the housing 12 and is configured to selectively mount the housing 12 to a back side 64 of a rearview mirror 62. The connector 44 comprises a first mating member 46, a second mating member 50, and an adhesive 60. The first mating member 46 comprises a panel 48 which is spaced from the rear wall 16. The second mating member 50 comprises a body 52 which defines a key slot 54 that extends therethrough. The panel 48 of the first mating member 46 is insertable into the key slot 54 to interlock with the body 52 of the second mating member 50. The key slot 54 includes a first portion 56 sized to receive the panel 48 and a second portion 58 narrower than the first portion 56 which interlocks with the panel 48 when the panel 48 is slid from the first portion 56 to the second. The adhesive 60 is coupled to the second mating member 50 and is configured to adhere to the rearview mirror 62.

In other embodiments, the connector 44 may comprise any suitable means for selectively mounting the housing 12 to the rearview mirror 62. For example, the connector 44 may comprise a latch, a hook-and-loop fastener, a snap connection, or the like. The connector 44 may include a release liner which protects the adhesive 60 until the connector 44 is ready to be mounted to the rearview mirror 62. The connector 44 may have mounting means other than the adhesive 60 for coupling to the rearview mirror 62 such as a threaded fastener, a clip, a clamp, or the like.

In use, the housing 12 is selectively mounted to the rearview mirror 62 to hang the accessory 66 behind the rearview mirror 62. To grasp the accessory 66, a portion of the accessory 66 is grasped between the engagement member 32 and the peripheral edge 24 of the slot 22 of the housing 12. This result is accomplished by pushing the button 38 toward the rear wall 16 of the housing 12 to move the engagement member 32 in the releasing action to expand the gap between the engagement member 32 and the peripheral edge 24 of the slot 22. The portion of the accessory 66 is inserted into the gap, and the button 38 is released so the bias member urges the engagement member 32 in the grasping action to grasp the portion of the accessory 66 between the engagement member 32 and the peripheral edge 24 of the slot 22.

The leading edge 34 is shaped to hook onto a looped string 68, cord, or the like of the accessory 66. The pointed end 36 of the leading edge 34 extends through the looped string 68 when the engagement member 32 moves in the grasping action to hook onto the looped string 68. The accessory 66 may be any item suitable for hanging from a rearview mirror 62 such as an air freshener, a souvenir, or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An accessory mounting device for a rearview mirror, the device comprising:
    a housing having a front wall, a rear wall, and a perimeter wall, the perimeter wall being coupled to and extending between the front and rear walls, the housing defining an interior space therein, the perimeter wall defining a slot extending therethrough to the interior space;
    an engagement member movably mounted in the housing, the engagement member being biased in a grasping action in which the engagement member is urged toward a peripheral edge of the slot, the engagement member and the peripheral edge of the slot being configured to cooperatively grasp an accessory therebetween when the engagement member is urged in the grasping action; and
    a button fixedly coupled to the engagement member and operable to move the engagement member in a release action away from the peripheral edge of the slot, thereby expanding a gap between the engagement member and the peripheral edge of the slot;
    wherein the housing is configured to selectively mount to a back side of the rearview mirror; and
    a grip coupled to the housing, the grip having a pair of contact portions positioned opposite each other across the housing, each contact portion comprising a pair of protrusions which extend outwardly away from the housing.

2. The device of claim 1, wherein the button protrudes through the front wall, the button being movable toward the rear wall to urge the engagement member in the release action.

3. The device of claim 1, further comprising a biasing member coupled to the button and the housing, the biasing member being configured to bias the engagement member in the grasping action.

4. The device of claim 3, wherein the biasing member comprises a compression spring positioned to urge the button away from the rear wall of the housing.

5. The device of claim 1, wherein the engagement member has a leading edge which is configured to engage the accessory during the grasping action, the leading edge tapering to a pointed end.

6. An accessory mounting device for a rearview mirror, the device comprising:
   a housing having a front wall, a rear wall, and a perimeter wall, the perimeter wall being coupled to and extending between the front and rear walls, the housing defining an interior space therein, the perimeter wall defining a slot extending therethrough to the interior space;
   an engagement member movably mounted in the housing, the engagement member being biased in a grasping action in which the engagement member is urged toward a peripheral edge of the slot, the engagement member and the peripheral edge of the slot being configured to cooperatively grasp an accessory therebetween when the engagement member is urged in the grasping action; and
   a button fixedly coupled to the engagement member and operable to move the engagement member in a release action away from the peripheral edge, thereby expanding a gap between the engagement member and the peripheral edge of the slot;
   wherein the housing is configured to selectively mount to a back side of the rearview mirror; and
   a connector coupled to the housing and configured to mount the housing to the rearview mirror, the connector comprising:
      a first mating member mounted to the rear wall of the housing, the first mating member comprising a panel spaced from the rear wall; and
      a second mating member selectively couplable to the first mating member, the second mating member comprising a body with a key slot extending therethrough, the panel of the first mating member being insertable into the key slot to interlock with the body of the second mating member, wherein the second mating member is configured to fixedly mount to the rearview mirror.

7. The device of claim 6, wherein the connector further comprises an adhesive coupled to the second mating member, the adhesive being configured to adhere to the rearview mirror.

8. An accessory mounting device for a rearview mirror, the device comprising:
   a housing having a front wall, a rear wall, and a perimeter wall, the perimeter wall being coupled to and extending between the front and rear walls, the housing defining an interior space therein, the perimeter wall defining a slot extending therethrough to the interior space;
   an engagement member movably mounted in the housing, the engagement member being biased in a grasping action in which the engagement member is urged toward a peripheral edge of the slot, the engagement member and the peripheral edge of the slot being configured to cooperatively grasp an accessory therebetween when the engagement member is urged in the grasping action, the engagement member having a leading edge which is configured to engage the accessory during the grasping action, the leading edge tapering to a pointed end;
   a button fixedly coupled to the engagement member and protruding through the front wall, the button being movable toward the rear wall to urge the engagement member in a release action away from the peripheral edge, thereby expanding a gap between the engagement member and the peripheral edge of the slot;
   a biasing member coupled to the button and the housing, the biasing member being configured to bias the engagement member in the grasping action, the biasing member comprising a compression spring positioned to urge the button away from the rear wall of the housing;
   a grip coupled to the housing, the grip having a pair of contact portions positioned opposite each other across the housing, each contact portion comprising a pair of protrusions which extend outwardly away from the housing; and
   a connector coupled to the housing and configured to selectively mount the housing to a back side of the rearview mirror, the connector comprising:
      a first mating member mounted to the rear wall of the housing, the first mating member comprising a panel spaced from the rear wall;
      a second mating member selectively couplable to the first mating member, the second mating member comprising a body with a key slot extending therethrough, the panel of the first mating member being insertable into the key slot to interlock with the body of the second mating member; and
      an adhesive coupled to the second mating member, the adhesive being configured to adhere to the rearview mirror.

* * * * *